US012565161B2

(12) United States Patent
Cieszyński et al.

(10) Patent No.: US 12,565,161 B2
(45) Date of Patent: Mar. 3, 2026

(54) SPACER

(71) Applicant: Aptiv Technologies AG, Schaffhausen (CH)

(72) Inventors: Michał Cieszyński, Cracow (PL); Tomasz Ślizowski, Cracow (PL); Jarosław Kozioł, Trzebinia (PL); Piotr Momot, Spytkowice (PL)

(73) Assignee: Aptiv Technologies AG, Schaffhause (CH)

( * ) Notice: Subject to any disclaimer, the term of this patent is extended or adjusted under 35 U.S.C. 154(b) by 191 days.

(21) Appl. No.: 18/422,190

(22) Filed: Jan. 25, 2024

(65) Prior Publication Data

US 2024/0246498 A1     Jul. 25, 2024

(30) Foreign Application Priority Data

Jan. 25, 2023    (EP) ..................................... 23153292

(51) Int. Cl.
 *H02G 3/22*          (2006.01)
 *B60R 16/02*        (2006.01)
(52) U.S. Cl.
 CPC ........... B60R 16/0222 (2013.01); H02G 3/22 (2013.01)
(58) Field of Classification Search
 CPC .. H02G 3/22; H02G 3/24; H02G 3/26; H02G 3/28; H02G 3/36; H02G 3/02; H02G 1/00; H02G 3/0462; B60R 16/0222; B60R 16/02; B60R 16/0207; H01B 3/302
 USPC ........ 174/152 G, 153 R, 135, 650; 248/49.1, 248/56; 385/134, 135; 16/2.1, 2.2
 See application file for complete search history.

(56) References Cited

U.S. PATENT DOCUMENTS

| | | | | |
|---|---|---|---|---|
| 3,092,360 | A * | 6/1963 | Cook ........................ | F16L 5/00 |
| | | | | 174/153 G |
| 4,889,450 | A | 12/1989 | Anne | |
| 6,225,562 | B1 * | 5/2001 | Fujishita ............ | B60R 16/0222 |
| | | | | 174/152 G |
| 6,552,270 | B1 * | 4/2003 | Heacox ................... | F16L 3/233 |
| | | | | 174/72 A |
| 6,710,249 | B1 * | 3/2004 | Denton .................... | H02G 3/24 |
| | | | | 174/152 G |
| 8,590,847 | B2 * | 11/2013 | Guthke .................... | H02G 3/32 |
| | | | | 248/74.1 |
| 8,707,515 | B2 * | 4/2014 | Payne .................. | H02G 15/007 |
| | | | | 16/2.5 |
| 9,512,824 | B2 * | 12/2016 | Bräbander ............... | H02G 3/32 |
| 9,711,956 | B1 * | 7/2017 | Welch .................. | H02G 3/0481 |
| 9,837,802 | B1 * | 12/2017 | Welch ..................... | H02G 1/08 |
| D860,765 | S * | 9/2019 | Tsay ............................... | D8/356 |

(Continued)

FOREIGN PATENT DOCUMENTS

| | | |
|---|---|---|
| DE | 2317752 A1 | 10/1974 |
| FR | 2602568 A1 | 2/1988 |

(Continued)

OTHER PUBLICATIONS

"Extended European Search Report"; European Patent Office; Mailed on Jun. 9, 2023; 9 pages.

*Primary Examiner* — Angel R Estrada
(74) *Attorney, Agent, or Firm* — Billion & Armitage

(57) ABSTRACT

A spacer configured to position a bundle of wires in a grommet includes a receptacle having a longitudinal axis for positioning a plurality of wires. A passage is provided between an outer circumference of the spacer and the receptacle.

16 Claims, 2 Drawing Sheets

(56)        References Cited

U.S. PATENT DOCUMENTS

| 12,108,558 | B2 * | 10/2024 | Yow | ........................ H04B 3/32 |
| 2017/0179703 | A1 | 6/2017 | Kominato et al. | |

FOREIGN PATENT DOCUMENTS

| GB | 2057595 | A | 4/1981 |
| JP | S63254604 | A | 10/1988 |

* cited by examiner

SPACER

CROSS-REFERENCE TO RELATED APPLICATION

This application claims the benefit of and priority to European Patent Application No. 23153292.0 titled "Spacer" filed on Jan. 25, 2023, the contents of which are incorporated by reference herein.

TECHNICAL FIELD

The present disclosure relates to a spacer configured to position a bundle of wires in a grommet.

BACKGROUND

Wire harnesses are provided with grommets overmolded on the wire harness for sealing purposes. For positioning the wires within the grommet, spacers may be used. However, wires may be clamped between two mold halves or after overmolding the grommet it may happen that wires are still visible on the grommet surface. Furthermore, known spacers may cause damage to the grommet during a product's lifetime. Accordingly, there is a need to provide a spacer that avoids the above described problems.

SUMMARY

In one aspect, the present disclosure is directed at a spacer configured to position a bundle of wires in a grommet, said spacer including a receptacle having a longitudinal axis for positioning a plurality of wires, with a passage being provided between an outer circumference of the spacer and the receptacle, wherein the spacer is in particular made of flexible and/or soft material, e.g. of a foamed polyurethane material.

By manufacturing the spacer of a flexible and/or soft material, such as foamed polyurethane, thermoplastic polyurethane, thermoplastic elastomer, holt melt, or other materials with similar properties, the risk of damaging the harness by transferring forces via the spacer is reduced. A spacer made of such a material—as compared to (hard) plastic material—has advantageous properties, such as a certain degree of compressibility and resiliency, which avoid a transfer of forces from the wire harness to the outer circumferential surface of the grommet thus avoiding stress spots after manufacture or during a product's lifetime.

According to an embodiment, the spacer has the general shape of a disk with a closed circumferential outer surface that is only interrupted by a single opening forming an entry of the passage. In this embodiment the wire harness can be centrally located within the spacer by guiding the wires through the entry and the passage into the receptacle. When placing the wire harness inserted in the spacer in a mold, the entry of the passage can be closed by slightly compressing the spacer that is e.g. made of a foamed material, such as foamed polyurethane material. Since the harness is centered within the mold, a minimum wall thickness of the grommet surrounding the harness is ensured.

According to an embodiment, the receptacle is surrounded by a plurality of flow channels extending through the spacer, wherein the flow channels have a closed circumferential surface. In this embodiment the flow channels allow the material of the grommet to flow freely through the spacer to achieve a homogeneous distribution of the grommet material within the mold and to provide an improved stabilization of the harness during injection of grommet material. Furthermore, the wire harness is surrounded by grommet material along the length and the circumference of the grommet. Therefore, the wires of the harness are not visible at the outer circumference of the grommet.

According to an embodiment, the flow channels have different cross-sections. For example, flow channels that are located closer to the longitudinal axis may have a smaller cross-section as compared to flow channels that are located closer to an outer circumference of the spacer. The compressibility of the spacer can be varied and adjusted.

According to an embodiment, the flow channels are arranged in a pattern of concentric rings with the flow channels of an outer ring having a larger cross-section than the flow channels of an inner ring. This contributes to stabilize the wire harness within the spacer and also within the grommet.

According to an embodiment, the spacer includes a partitioning wall with a zigzag shape along a circumference of the partitioning wall. Such design allows to use one and the same spacer for different harness diameters and also for different mold diameters. If the spacer is made of a foamed and/or elastic material, the receptacle may be expanded to a certain extent when the wire harness is inserted in the receptacle. Simultaneously, the spacer may be compressed when placing the spacer in the mold.

According to an embodiment, the spacer has a set of radial inner partitioning walls and a set of radial outer partitioning walls with the radial inner partitioning walls being located between the radial outer partitioning walls. This provides a stable design wherein the spacers between the partitioning walls are uniformly varied when the spacer is compressed either towards the longitudinal axis or in the opposite direction.

According to an embodiment, the receptacle is located at a center of the spacer with a circumferential wall of the receptacle having the shape of a circular ring. In this embodiment, the circumferential wall may form a sleeve around the wire harness, thereby positioning and stabilizing the wire harness at a center of the mold and of the grommet.

According to an embodiment, an axial dimension of the radial partitioning walls is less than an axial dimension of the circumferential wall. For example, the axial dimension of the radial partitioning walls amounts to about 50% or to about 35% of the axial dimension of the circumferential wall. In this embodiment, the radial partitioning walls are sprocket-like and serve to stabilize the spacer on the one hand. On the other hand, such partitioning walls improve the flow of grommet material through the spacer during molding of the grommet.

According to an embodiment, an outer circumferential surface of the spacer is inclined with respect to the longitudinal axis. In this embodiment, the outer circumferential surface of the spacer is not oriented in parallel to the longitudinal axis but provides a peak with a maximum diameter.

According to an embodiment, the outer circumferential surface of the spacer includes two partial circumferential surfaces that are both inclined with respect to the longitudinal axis and that include an obtuse angle. The outer circumferential surface forms a (circular) peak line that defines a maximum diameter of the spacer.

According to an embodiment, the spacer includes a plurality of concentric walls, wherein the concentric walls are optionally spaced by means of webs. This prevents an unwanted penetration of mold release agent into the grommet material upon manufacturing the grommet. The spaced concentric walls provide an obstacle for the liquid release agent that may flow over an outer surface of the spacer.

According to an embodiment, the outer circumferential surface of the spacer is provided with bumps serving as distance elements to reduce the visibility of the spacer on the grommet surface.

In another aspect, the present disclosure is directed at a system including a grommet and a spacer, for example a spacer as disclosed above, wherein the spacer is configured to position a bundle of wires in the grommet and the grommet is overmolded onto the harness and the spacer.

In this embodiment, the spacer and the grommet can be made of the same type of material or at least of two materials having similar mechanical properties as regards compressibility, flexibility and stiffness, such as polyurethane materials or other materials with different hardness. This prevents the transmission of forces from the wire harness to an outer circumferential surface of the grommet, thereby avoiding stress spots or rupture on an outer surface of the grommet. However, according to a further embodiment, the spacer and the grommet can also be made of different materials.

According to an embodiment, the grommet and the spacer are made of a foamed material, such as foamed polyurethane, material, or a foamed thermoplastic polyurethane, thermoplastic elastomer, holt melt, or other material, with similar properties. For manufacturing (first) the spacer and (thereafter) the grommet the material is injected in a mold in a liquid form where it foams (expands) and fills the mold. After curing, the final product is received.

The present disclosure is also directed at a method of manufacturing a system as described above, the method including the steps of molding the spacer, at least partly curing the spacer, inserting wires in a receptacle of the spacer, placing the spacer and the wires in a mold, overmolding the spacer and the wires in the mold to form a grommet, and curing the grommet.

The spacer may be fully cured before inserting wires in the receptacle. When molding the spacer without a release agent, a partly curing can be sufficient.

BRIEF DESCRIPTION OF THE DRAWINGS

The spacer is now described, by way of example with reference to the accompanying drawings, in which.

DETAILED DESCRIPTION

Figure 1:
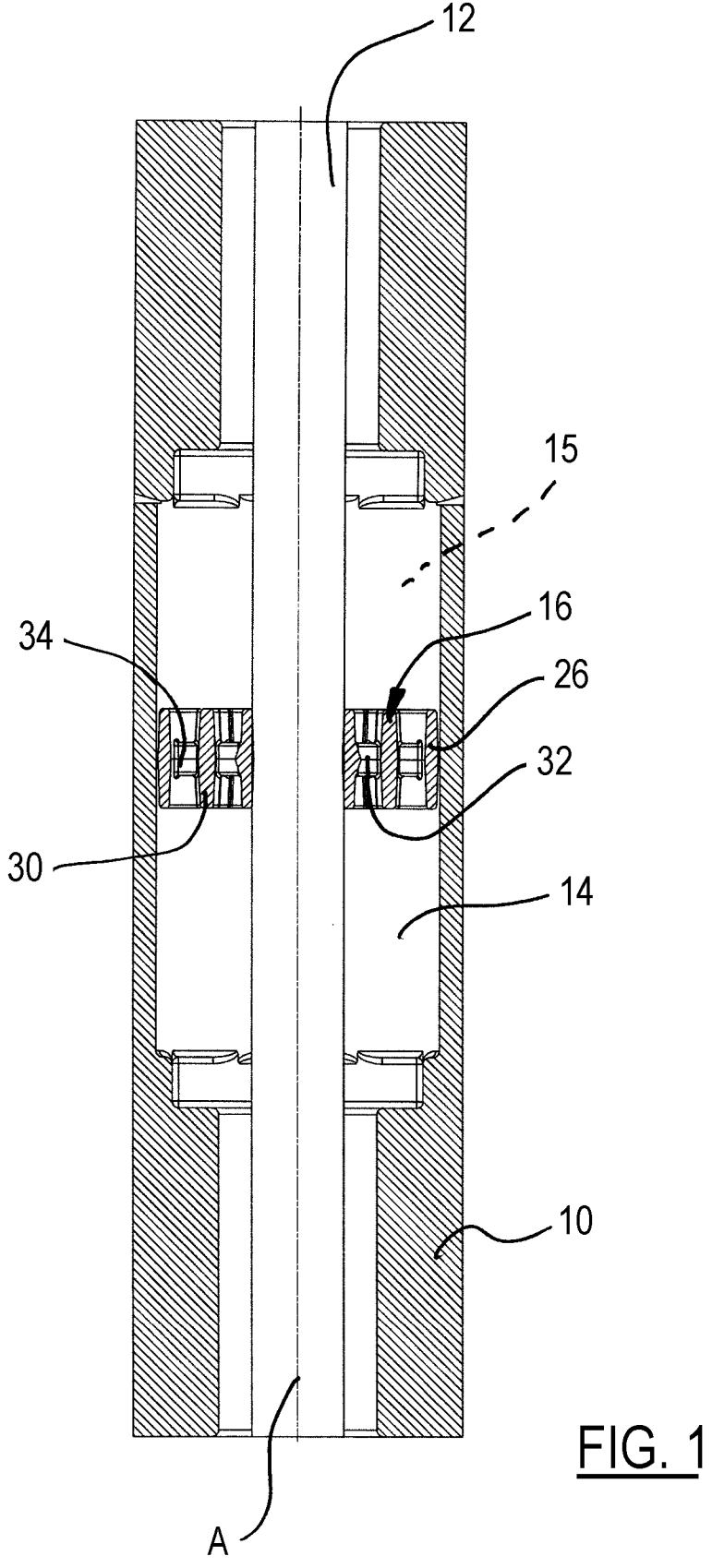
FIG. 1 illustrates a lengthwise cross-section view of a mold for manufacturing a grommet according to some embodiments.

FIG. 1 depicts a cross-section of a mold 10 for overmolding a grommet (indicated with a dashed line) onto a bundle of wires 12. For positioning the bundle of wires 12 in a cavity 14 of the mold 10 a spacer 16 is provided. The spacer 16 positions the bundle of wires 12 along a longitudinal axis A. When the cavity 14 is filled with grommet material, for example foamed polyurethane material, the grommet 15 is formed around the bundle of wires 12.

Figure 2:
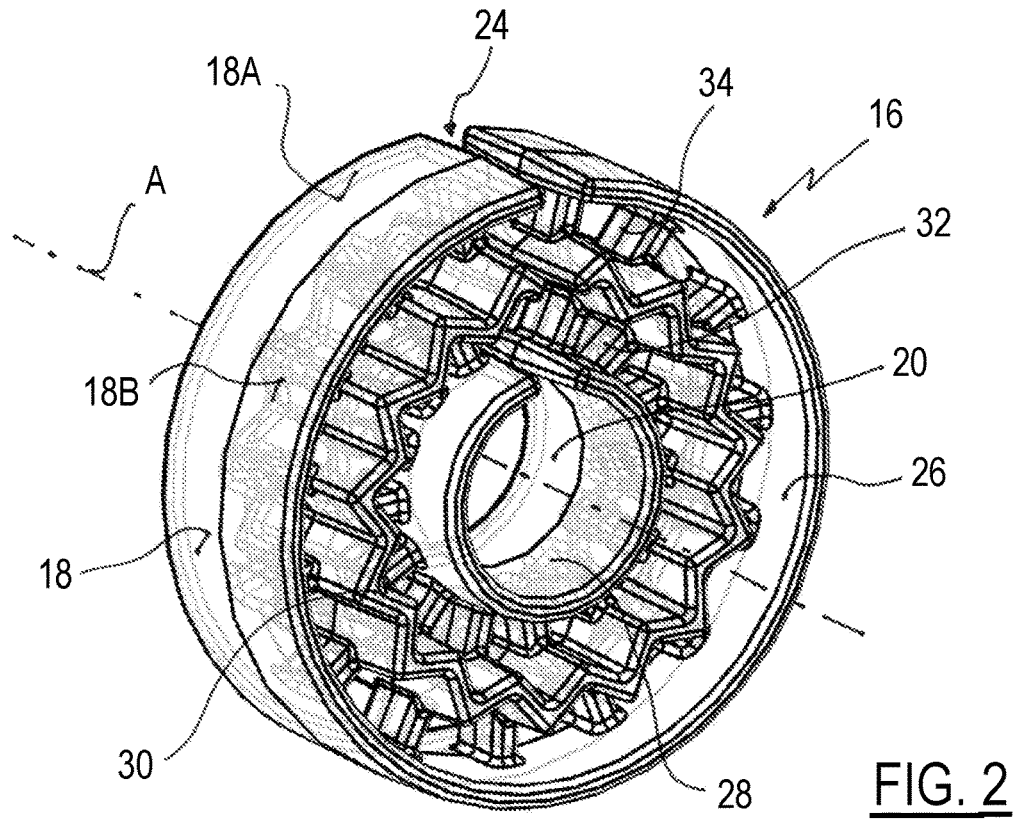
FIG. 2 illustrates an isometric view of a spacer according to some embodiments.

FIG. 2 depicts an isometric view of the spacer 16 of FIG. 1. In the embodiment shown, the spacer 16 includes a central receptacle 20 having a longitudinal axis A for receiving and positioning the bundle of wires 12 or a plurality of wires. For inserting the wires 12 into the receptacle 20 a passage 22 is provided between an outer circumference of the spacer 16 and the receptacle 20.

In the embodiment shown, the spacer 16 has the general shape of a disk with a closed circumferential outer surface 18 that is only interrupted by a single opening 24 forming an entry of the passage 22. The spacer 16 is molded and is for example made of a flexible and/or soft material that can be flexed and/or compressed to certain extent, such as foamed material, for example foamed polyurethane material. The spacer 16 is integrally formed as a single piece of material.

An outer circumferential wall 26 of the spacer 16 forming the circumferential outer surface 18 has an axial length that corresponds to an axial length of an inner circumferential wall 28 surrounding and forming the receptacle 20. Between the outer circumferential wall 26 and the inner circumferential wall 28 a circular partitioning wall 30 is provided, said partitioning wall 30 having a zigzag or chevron shape along its circumference. An axial length of the partitioning wall 30 corresponds to the axial length of the outer circumferential wall 26 and the inner circumferential wall 28.

Between the inner circumferential wall 28 and the partitioning wall 30 a set of radial inner webs 32 is provided. The webs 32 extend in a radial direction and connect to the partitioning wall 30 at the inner peaks of the partitioning wall 30. Further, a set of radial outer webs 34 is provided between the partitioning wall 30 and the outer circumferential wall 26, wherein the webs 34 connect to the partitioning wall 30 at radial outer peaks of the partitioning wall 30. The radial inner partitioning webs 32 are located between the radial outer webs 34 as seen in a circumferential direction.

Figure 3:
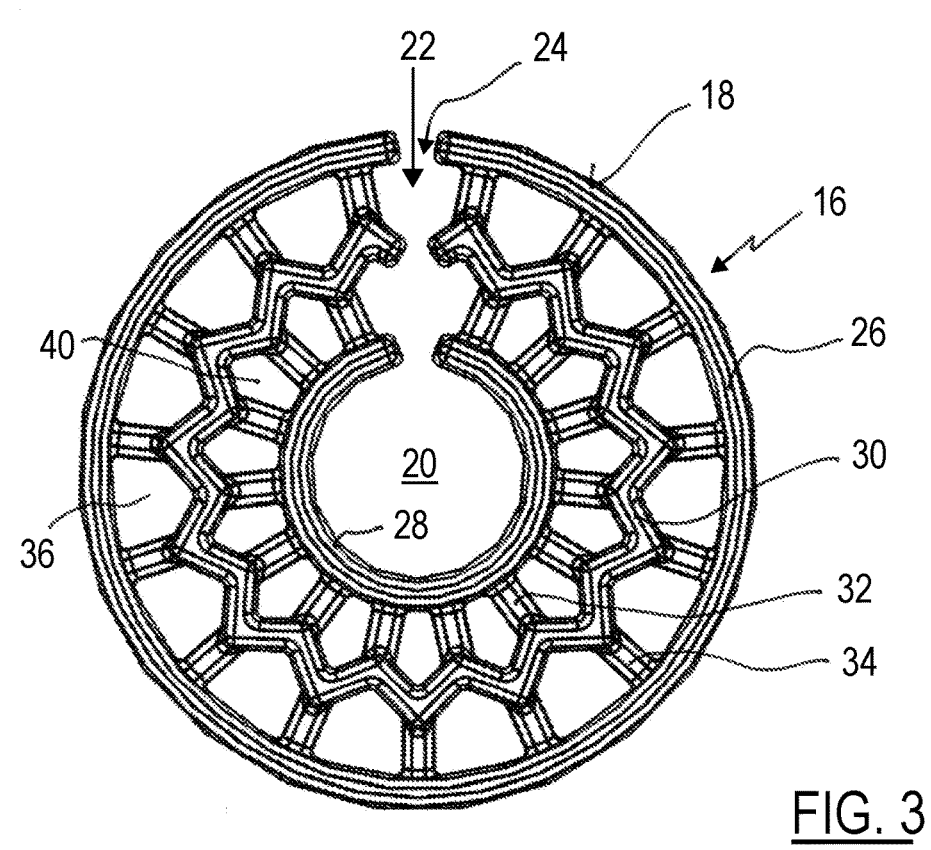
FIG. 3 illustrates a front view of the spacer of FIG. 1 according to some embodiments.

As shown in FIG. 3, the inner circumferential wall 28, the partitioning wall 30 and the outer circumferential wall 26 form together with the radial inner webs 32 and the radial outer webs 34 a plurality of flow channels 36, 40 that extend through the spacer 16, the flow channels having a closed circumferential surface. It can be seen that the flow channels 36, 40 are arranged in a pattern of (two) concentric rings with flow channels 36 of an outer ring having a larger cross-section than flow channels 40 of an inner ring.

As shown in FIGS. 1 and 2, an axial dimension of the radial webs 32, 34 is less than an axial dimension of the outer circumferential wall 26 (and also of the inner circumferential wall 28 and the partitioning wall 30). In the embodiment shown, the axial dimension of the radial webs 32, 34 amounts to about 30-40% of the axial dimension of the outer circumferential wall 26 and of the inner circumferential wall 28 and the partitioning wall 30.

As shown in FIG. 2, the outer circumferential surface 18 of the spacer includes two partial circumferential surfaces 18A and 18B that are both inclined with respect to the longitudinal axis A and that include an obtuse angle of slightly less than 180°. This allows grommet material to almost completely surround the spacer 16 upon molding the grommet 15.

When filling the mold 10 with grommet material, the grommet material enters the cavity 14, expands (foams) and forms grommet 15.

A method of manufacturing a bundle of wires provided with a grommet includes the steps of molding a spacer in a mold separate from the mold 10 and at least partly curing the spacer. This allows potential mold release agent to evaporate. Thereafter, the bundle of wires is inserted in a receptacle of the spacer and the spacer with the inserted wires is placed in the mold 10. Thereafter, the spacer and the wires in the mold are overmolded with grommet material that is cured to form the grommet 15. The grommet material and the material of the spacer may be the same or different material and may include a foamed material, such as foamed polyurethane.

While this invention has been described in terms of the preferred embodiments thereof, it is not intended to be so limited, but rather only to the extent assembly forth in the claims that follow. For example, the above-described embodiments (and/or aspects thereof) may be used in combination with each other. In addition, many modifications may be made to configure a particular situation or material to the teachings of the invention without departing from its scope. Dimensions, types of materials, orientations of the various components, and the number and positions of the various components described herein are intended to define parameters of certain embodiments and are by no means limiting and are merely prototypical embodiments.

Many other embodiments and modifications within the spirit and scope of the claims will be apparent to those of skill in the art upon reviewing the above description. The scope of the invention should, therefore, be determined with reference to the following claims, along with the full scope of equivalents to which such claims are entitled.

As used herein, 'one or more' includes a function being performed by one element, a function being performed by more than one element, e.g., in a distributed fashion, several functions being performed by one element, several functions being performed by several elements, or any combination of the above.

It will also be understood that, although the terms first, second, etc. are, in some instances, used herein to describe various elements, these elements should not be limited by these terms. These terms are only used to distinguish one element from another. For example, a first contact could be termed a second contact, and, similarly, a second contact could be termed a first contact, without departing from the scope of the various described embodiments. The first contact and the second contact are both contacts, but they are not the same contact.

The terminology used in the description of the various described embodiments herein is for the purpose of describing embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses all possible combinations of one or more of the associated listed items. It will be further understood that the terms "includes," "including," "includes," and/or "including," when used in this specification, specify the presence of stated features, integers, steps, operations, elements, and/or components, but do not preclude the presence or addition of one or more other features, integers, steps, operations, elements, components, and/or groups thereof.

As used herein, the term "if" is, optionally, construed to mean "when" or "upon" or "in response to determining" or "in response to detecting," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]," depending on the context. Additionally, while terms of ordinance or orientation may be used herein these elements should not be limited by these terms. All terms of ordinance or orientation, unless stated otherwise, are used for purposes distinguishing one element from another, and do not denote any order of arrangement, order of operations, direction or orientation unless stated otherwise.

The invention claimed is:

1. A spacer configured to position a bundle of wires in a grommet, said spacer comprising:
a receptacle having a longitudinal axis for positioning a plurality of wires, wherein a passage is provided between an outer circumference of the spacer and the receptacle and wherein the spacer is made of a foamed material, wherein the receptacle is surrounded by a plurality of flow channels extending through the spacer, and wherein the flow channels have a closed circumferential surface.

2. The spacer according to claim 1, wherein the spacer generally has a disk shape with a closed circumferential outer surface that is only interrupted by a single opening forming an entry of the passage.

3. The spacer according to claim 1, wherein the flow channels have different cross-sections.

4. The spacer according to claim 1, wherein the spacer has a set of radial inner webs and a set of radial outer webs with the radial inner webs being located between the radial outer webs.

5. The spacer according to claim 4, wherein the receptacle is located at center of the spacer, with a circumferential wall of the receptacle having a circular ring shape.

6. The spacer according to claim 5, wherein an axial dimension of the radial webs is less than an axial dimension of the circumferential wall.

7. The spacer according to claim 6, wherein the axial dimension of the circumferential wall is within a range of about 35% to 50% of the axial dimension of the circumferential wall.

8. The spacer according to claim 1, wherein the spacer comprises a plurality of concentric walls.

9. The spacer according to claim 8, wherein the concentric walls are spaced by means of webs.

10. The spacer according to claim 1, wherein an outer circumferential surface of the spacer is provided with bumps.

11. A system, comprising:
a grommet; and
a spacer according to claim 1, wherein the spacer is configured to position a bundle of wires in the grommet and wherein the grommet and the spacer are made of the same material and the grommet is overmolded onto the wires and the spacer.

12. The system of claim 11, wherein the grommet and the spacer are made of a foamed material.

13. The system of claim 11, wherein the grommet and the spacer are made of a polyurethane material.

14. A spacer configured to position a bundle of wires in a grommet, said spacer comprising:
a receptacle having a longitudinal axis for positioning a plurality of wires, wherein a passage is provided between an outer circumference of the spacer and the receptacle and wherein the spacer is made of a foamed material, wherein the receptacle is surrounded by a plurality of flow channels extending through the spacer, and wherein the flow channels are arranged in a pattern of concentric rings with the flow channels of an outer ring having a larger cross-section than the flow channels of an inner ring.

15. A spacer configured to position a bundle of wires in a grommet, said spacer comprising:

a receptacle having a longitudinal axis for positioning a plurality of wires, wherein a passage is provided between an outer circumference of the spacer and the receptacle and wherein the spacer is made of a foamed material wherein the spacer comprises a partitioning wall with a zigzag shape along a circumference of the partitioning wall.

16. A method of manufacturing a system including a grommet and a spacer including a receptacle having a longitudinal axis for positioning a plurality of wires, with a passage being provided between an outer circumference of the spacer and the receptacle, wherein the spacer is in particular made of a foamed material, said method comprising the steps of:

molding the spacer, at least partly curing the spacer, inserting wires in a receptacle of the spacer, placing the spacer and the wires in a mold, overmolding the spacer and the wires in the mold to form a grommet, and curing the grommet.

* * * * *